No. 677,768. Patented July 2, 1901.
W. T. JONES.
OAR MAKING MACHINE.
(Application filed Sept. 15, 1900.)
(No Model.) 4 Sheets—Sheet 1.
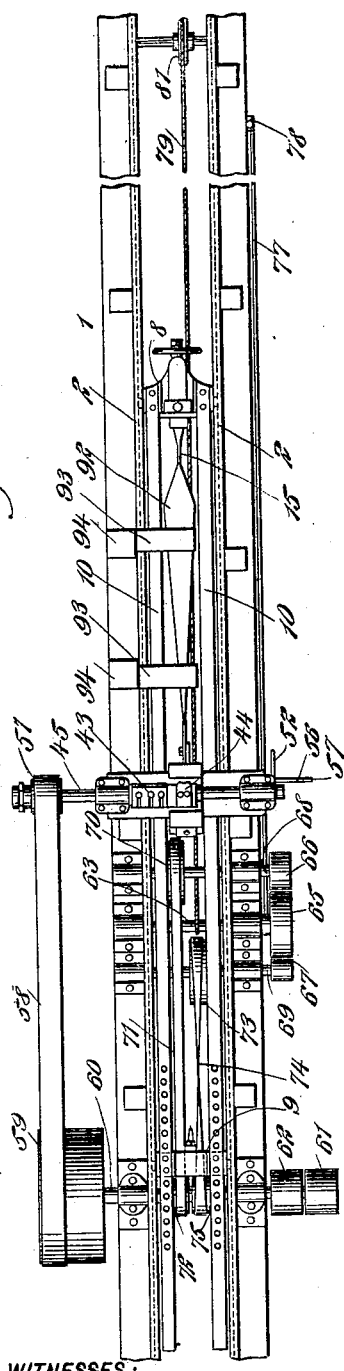
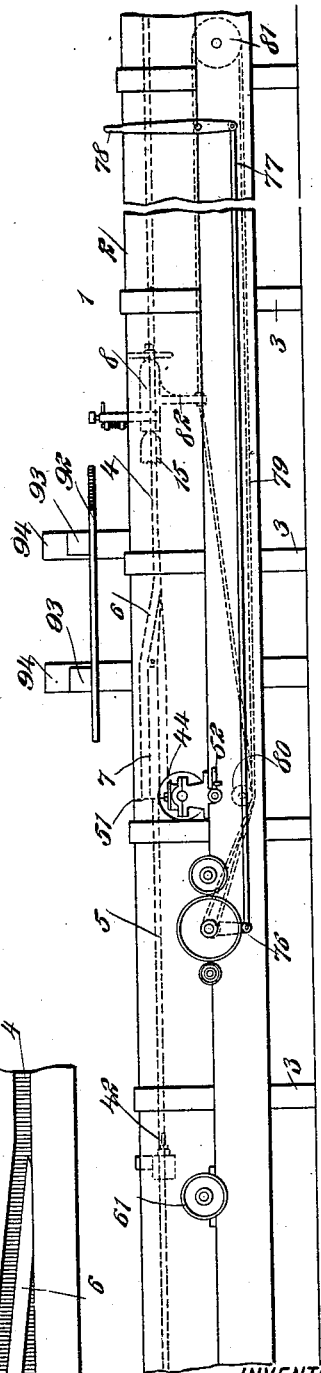
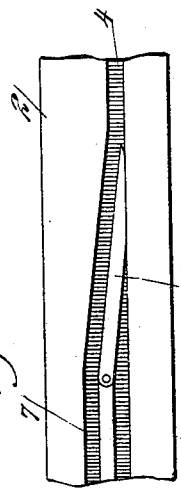
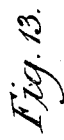
WITNESSES:
Edward Thorpe
C. R. Ferguson
INVENTOR
William T. Jones.
BY
ATTORNEYS
THE NORRIS PETERS CO., PHOTO-LITHO., WASHINGTON, D. C.

No. 677,768. Patented July 2, 1901.
W. T. JONES.
OAR MAKING MACHINE.
(Application filed Sept. 15, 1900.)
(No Model.) 4 Sheets—Sheet 2.
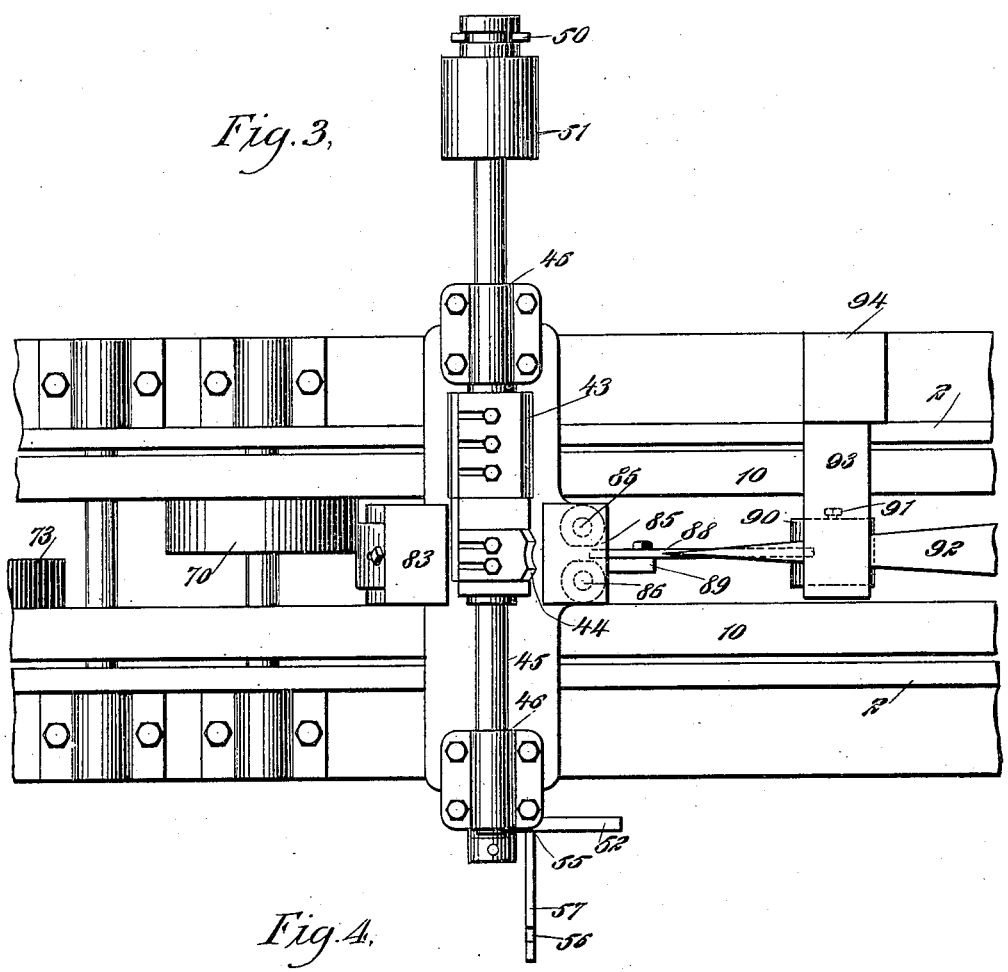
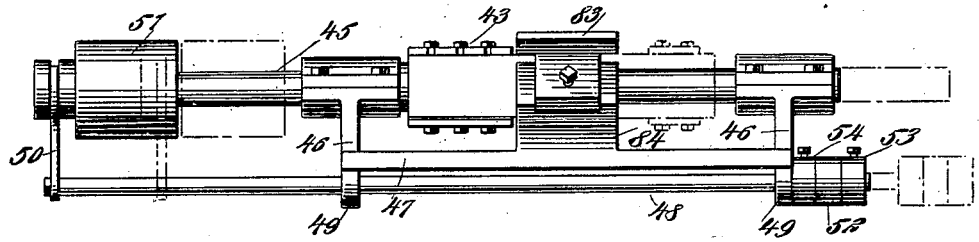
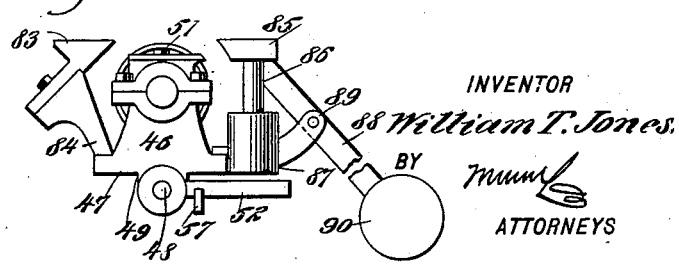
WITNESSES:
Edward Thorpe
C. R. Ferguson
INVENTOR
William T. Jones.
BY
ATTORNEYS
THE NORRIS PETERS CO., PHOTO-LITHO., WASHINGTON, D. C.

No. 677,768. Patented July 2, 1901.
W. T. JONES.
OAR MAKING MACHINE.
(Application filed Sept. 15, 1900.)
(No Model.) 4 Sheets—Sheet 3.

WITNESSES:
Edward Thorpe
C. R. Ferguson

INVENTOR
William T. Jones.
BY
ATTORNEYS

THE NORRIS PETERS CO., PHOTO-LITHO., WASHINGTON, D. C.

No. 677,768. Patented July 2, 1901.
W. T. JONES.
OAR MAKING MACHINE.
(Application filed Sept. 15, 1900.)
(No Model.) 4 Sheets—Sheet 4.
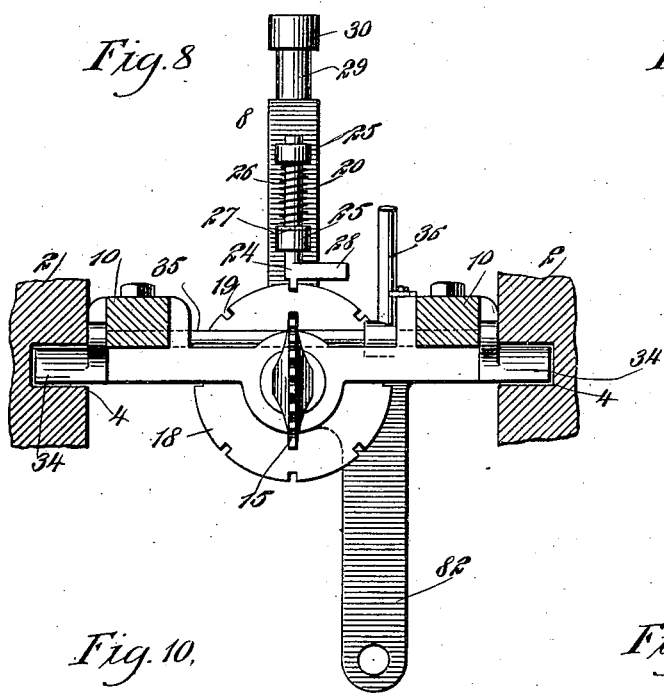
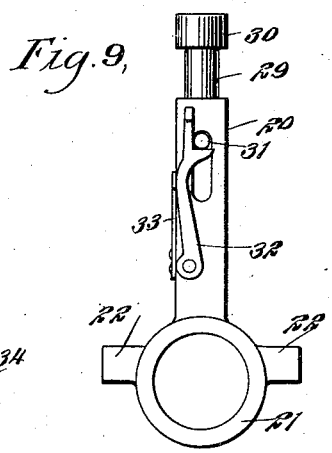
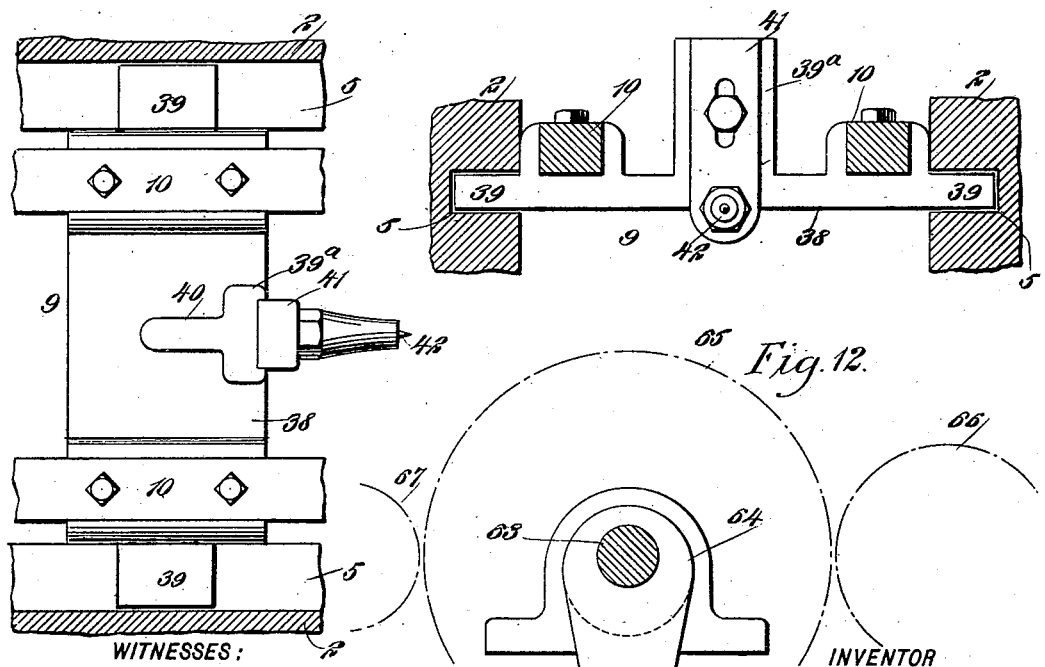
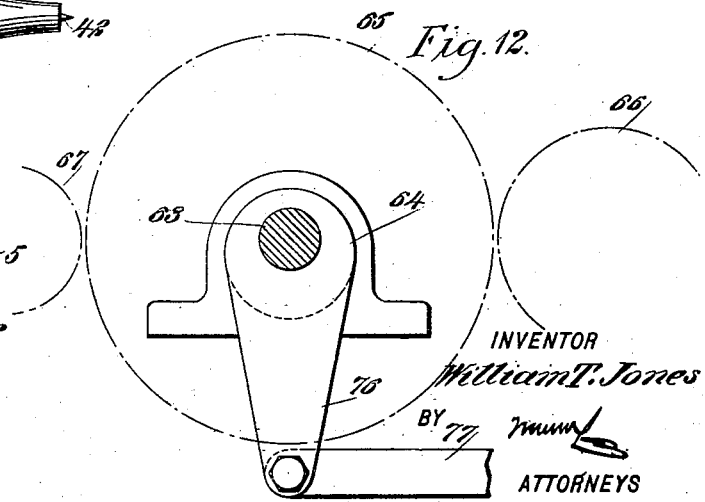
WITNESSES:
Edward Thorpe
C. R. Ferguson
INVENTOR
William T. Jones
BY
ATTORNEYS
THE NORRIS PETERS CO., PHOTO-LITHO., WASHINGTON, D. C.

United States Patent Office.

WILLIAM T. JONES, OF NEW WESTMINSTER, CANADA.

OAR-MAKING MACHINE.

SPECIFICATION forming part of Letters Patent No. 677,768, dated July 2, 1901.

Application filed September 15, 1900. Serial No. 30,099. (No model.)

*To all whom it may concern:*

Be it known that I, WILLIAM T. JONES, a subject of the Queen of Great Britain, and a resident of New Westminster, in the Province of British Columbia and Dominion of Canada, have invented a new and Improved Oar-Making Machine, of which the following is a full, clear, and exact description.

This invention relates to improvements in machines for making oars and similar irregularly-shaped work; and the object is to provide a machine of very simple construction and by means of which the work or oars may be rapidly shaped out.

I will describe an oar-making machine embodying my invention and then point out the novel features in the appended claims.

Reference is to be had to the accompanying drawings, forming a part of this specification, in which similar characters of reference indicate corresponding parts in all the figures.

Figure 6:
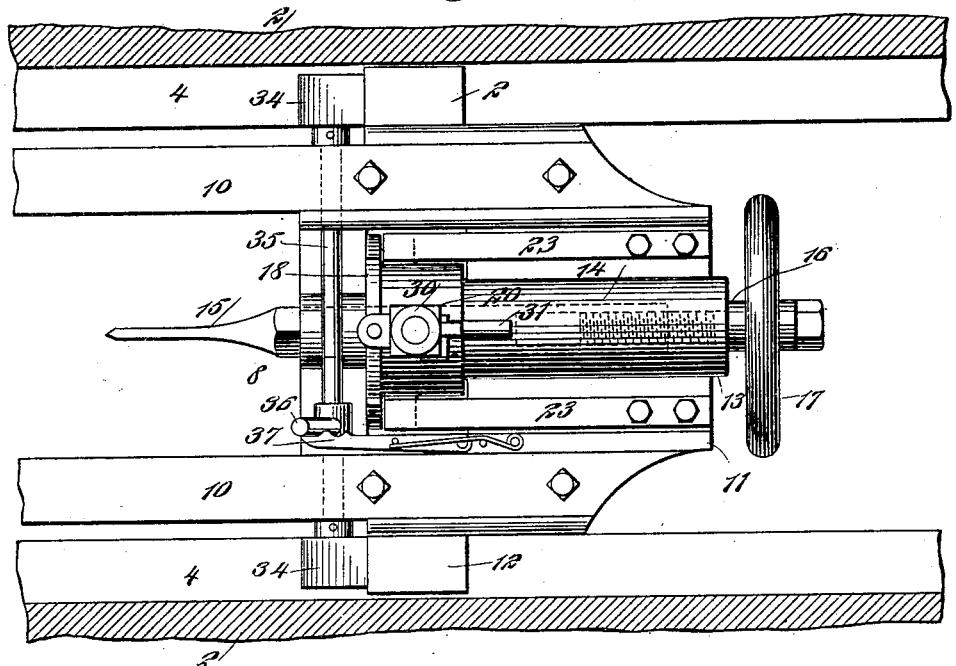
Figure 7:
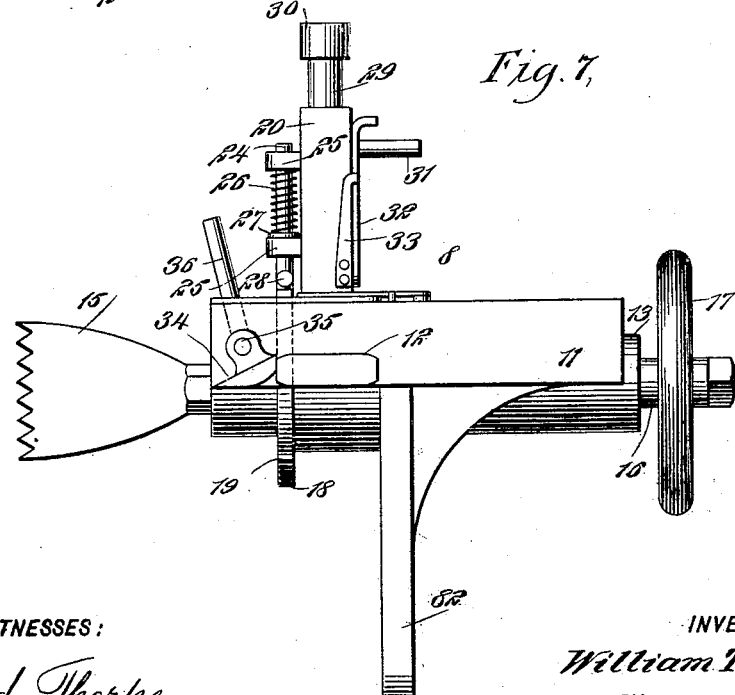

Figure 1 is a plan view of a machine embodying my invention. Fig. 2 is a side elevation thereof. Fig. 3 is a plan view of a portion of the machine, showing the cutter-head. Fig. 4 is a front view of the cutter-head. Fig. 5 is an end view thereof. Fig. 6 is a plan of the head-stock. Fig. 7 is a side elevation thereof. Fig. 8 is a front elevation of the head-stock. Fig. 9 is an elevation of a shifting lever employed. Fig. 10 is a plan of the tail-stock. Fig. 11 is a front view thereof. Fig. 12 is a side view showing means for shifting a driving-roller, and Fig. 13 shows one of two switch devices employed.

Referring to the drawings, 1 designates a frame, consisting of side pieces 2, supported on suitable legs 3. On the inner side of the side pieces are channels 4, forming guides for the movement of the head-stock portion of a carrying-frame, and channels 5, forming guides for the tail-stock portion of said carriage. At the end of the channels 4 are switches 6, adapted to direct the head-stock either into a continuance of the channels 4 or into a higher channel 7, for a purpose to be hereinafter described, and it may be here stated that the channels 5 are on a level higher than the channels 4, so as to provide for the taper of the oar shank or handle.

The carriage for the work comprises a head-stock 8 and a tail-stock 9, connected one with the other by means of side bars 10. The tail-stock is adjustable on the side bars, so as to accommodate the device for different lengths of oars. The head-stock consists of a base-plate 11, having lateral lugs 12 for engaging in the guides, and formed on this base-plate is a sleeve 13, in which a tubular spindle 14 is designed to rotate and also to have longitudinal movement. Removably connected to the forward end of this tubular spindle is a blade-like spur 15 for engaging the blade end of the oar, and the opposite end of this spindle is provided with an interior screw-thread for engagement with a bolt 16, having a hand-wheel 17 at its outer end and designed to move the spindle carrying the spur longitudinally of the sleeve 13. Rigidly connected to the spindle is a disk 18, in the edge of which notches 19 are formed, these notches being arranged at equal distances one from another. The disk may be connected to the spindle by any desired means—such, for instance, as by a spline.

Mounted to rotate on the spindle, between the sleeve 13 and the disk 18, is a shifting-lever 20. This shifting-lever has a collar portion 21, engaging around the spindle, and extended laterally from this collar are lugs 22, engaged by the free ends of springs 23, the opposite ends of said springs being bolted or otherwise secured to the base-plate, as plainly illustrated in Fig. 6. Mounted on the shifting-lever is a locking-bolt 24, designed to engage in either one of the notches 19 of the disk 18. This locking-bolt is movable in bearings 25, formed on the shifting-lever, and is forced normally downward by means of a spring 26, engaging at its lower end with a collar 27, attached to the bolt, and at its opposite end against the upper bearing 25. For convenience in raising the locking-bolt it is provided with a handle 28.

A tappet-rod 29 is movable vertically in a longitudinal bore formed in the body portion of the shifting-lever, and in fact this tappet-arm forms a portion of the lever. At the upper end it is provided with an antifriction-roller 30 to engage with a blade-pattern, to be hereinafter described. A finger piece or handle 31 extends outward from the tappet-arm 29 through a slot in the rear wall of the lever 20 and is designed to be engaged to hold the tappet-arm in its uppermost position by means of a latch 32, pivoted to the lever 20 and moved into engagement therewith by means of a plate-spring 33, attached to said lever. Also carried by the head-stock are switch-shoes 34. These switch-shoes move in the channels in the side pieces 2, and each one is rounded on its under side, as plainly indicated in Fig. 7, and they are designed to coact with the switches 6 during the operation of forming the blade portion of the oar. These switch-shoes are attached to a rock-shaft 35, provided with an upwardly-extended handle 36, which may be held in either of its adjusted positions by entering it in one of two notches formed in a spring-pressed latch 37, attached to the base-plate.

The tail-stock comprises a bed-plate 38, from which lugs 39 extend into the channels 5. Extended upward on the front side of this bed-plate 38 is a post $39^a$, having a bracing-web 40, and adjustable on this post $39^a$ is a carrier-plate 41 for a centering-point 42. As here shown, the plate 41 is provided with a slot through which a fastening-bolt passes, the said bolt also passing into a tapped opening in the post $39^a$.

The cutter-head comprises a cutter 43 for cutting the blade portion of the oar and a cutter 44, which, as shown, is concaved for cutting the circular or handle portion of the oar. These cutters are mounted on suitable blocks attached to a shaft 45, adapted to be shifted longitudinally in bearings 46, attached to the bed-plate 47 of the cutter-head. A shifting-rod 48 is movable in bearings 49, extended downward from the bearings 46, and at one end this shifting-rod has a link connection 50 with the end of the shaft 45. The upper end of this link is made in the form of a yoke to engage in an annular channel formed in the end of the shaft, and on this end of the shaft is a wide band-wheel 51. Attached to the opposite end of the shifting-rod 48 is a shifting-lever 52. This shifting-lever has a collar loosely engaging with the shaft between two stop-collars 53 54, and the lever portion extended at right angles from the shaft is adapted to engage in either one of notches 55 or 56, formed in a latch-bar 57, so as to hold the shaft 45 in either of its adjusted positions, depending upon which one of the cutters is designed to be brought into operation.

Rotary motion is imparted to the cutter-head by means of a band 58, engaging with the pulley 51 and also with a pulley 59 on a driving-shaft 60, having bearings in boxings secured to the frame of the machine, and on the opposite end of this driving-shaft are fast and loose pulleys numbered, respectively, 61 and 62.

I will now describe a means for imparting a back-and-forth movement to the work-carrying carriage: This means consists of a winding-shaft 63, which at one end has a bearing in an eccentric boxing 64, and at the other end has a bearing in a shifting boxing. On the outer end of this winding-shaft 63 is a main friction-roller 65, designed to engage with either one of the friction-rollers 66 or 67, attached, respectively, to the shafts 68 and 69. On the shaft 68 is a pulley 70, from which a band 71 extends to a pulley 72 on the driving-shaft 60, and on the shaft 69 is a pulley 73, from which a band 74 extends to a pulley 75 on the driving-shaft, this band 74 being crossed so as to give a reverse or backward movement to the carriage, as will be hereinafter described, and as this motion may be equal as compared to the forward movement of the carriage the friction-roller 67 is made considerably smaller than the roller 66. To shift the main friction-roller 65 into engagement with either one of the rollers 66 or 67, a crank-arm 76 is extended from the eccentric boxing 64, and from this crank-arm 76 a shifting-rod 77 extends toward the front end of the machine, where it is provided with an operating-lever 78. A rope or cable 79 has its ends turned around the winding-shaft 63 in opposite directions. Both stretches of this rope or cable are carried under an idler 80 and around a pulley 81, attached to the forward end of the machine, and the upper stretch of this rope or cable is connected to an arm 82, extended downward from the head-stock.

To prevent the work from crowding down too closely upon the cutter-head, I place at one side thereof a supporting-table 83. This supporting-table is attached to a standard 84, extended from the base-plate of the cutter-head, and at the opposite side of the cutter-head is a chip-breaker consisting of a plate 85, extended downward from which are rods 86, movable in castings 87 on the base of the cutter-head. This chip-breaker is held yieldingly against the work forward of the cutter-head by means of a lever 88, pivoted to a bracket 89, extended from the castings 87. The upper end of this lever 88 engages with the under side of the plate 85, and on the opposite end of the lever a weight 90 is adjustable. The object in adjusting the weight is to regulate the pressure of the chip-breaker against the work, and it may be held as adjusted by means of a set-screw 91.

Arranged above the frame of the machine is a blade-pattern 92, adapted to be engaged at its edges by the roller 30 on the tappet-arm 29. This pattern is supported by transverse arms 93, connected to standards 94.

The operation is as follows: When it is desired to operate the machine, it is set in motion by shifting the driving-belt from the loose pulley on the driving-shaft to the tight pulley thereof. Motion is conveyed from the large pulley on the opposite end of the shaft to the pulley on the cutter-head shaft, and motion is conveyed to the two feed-shafts 63 and 69 by the belts, as before mentioned. It is to be understood before starting the machine that the stick or timber from which the oar or other work is to be formed is to be connected and centered by the head and tail stocks. The operator then sets or shifts the cutter-head shaft to bring the concaved cutter-head 44 to the center of the oar-carriage. The latch or lock 24 is placed in a notch of the disk 18 in such manner as to bring the thin way of the spur at right angles to the shaft of the cutter. The oar-carriage is set in forward motion by moving the hand-lever and the rod 77, which brings the main friction-pulley on the winding-shaft in contact with the friction-pulley 66. This causes the rope to wind around the winding-shaft and pull the oar-carriage with it. The forward motion of the oar-carriage brings the timber in contact with the concaved cutter, which cuts away a portion of the timber, leaving a portion planed round and smooth. Now it is evident that as the carriage proceeds forward and when the switch-shoes 34 come to the switches 6 if the switch-openers or switch-shoes are lifted up they will ride upon the switches and carry the timber higher or away from the cutter, and thus form one side of the edge of the oar-blade. It is also evident that as the oar-carriage proceeds forward the weight of the lever on the chip-breaker will cause the chip-breaker to press against the timber and prevent the cutter from splitting off too much wood. It is also evident that when the table behind the cutter is properly adjusted it will prevent the wood sinking down too far upon the cutter when the oar-carriage has brought the spur on the head-stock up to the cutter, and thus completed its course. The motion of the carriage is then reversed by moving the roller 65 into engagement with the roller 67, so that it will move rapidly to its original position. The operator then lifts the lock 24 out of its notch and turns the timber upside down and lets the bolt 24 drop into the opposite notch of the disk 18. The oar-carriage is again set in forward motion and the former operation is repeated and the carriage is again brought back to its original position. The operator then lifts the latch or locking bolt 24 out of the notch and sets it in the next notch—that is, by turning the disk 18 relatively to the bolt, and consequently rotating the timber—and the former operation is repeated, when the operator reverses the oar-carriage and brings it back, when the lugs on the head-stock have rounded at the front end of the switches 6. This operation is repeated for the remaining notches in the disk 18, when it is evident that the handle of the oar and the edges of the blade will have been fully formed. The lever 52 is now to be lifted from the notch 55 and drawn outward and placed into the notch 56. This of course will move the shaft 45 to bring the cutter 43 into operative position. Now the tappet-arm 29 is to be raised and held by means of the devices 32, so as to bring the roller 30 in line with the edges of the pattern 92. The bolt 24 is now to be set into a notch of the disk 18, which will bring the blade of the oar to the same plane as the cutter-head, and it will now be observed that the two springs 23 will press upon the lugs at the sides of the collar 21, causing the shifting-lever 25 to maintain an upright position, and consequently govern the position of the timber in the oar-carriage. The oar-carriage is now set in forward motion and the roller 30 comes in contact with one side of the blade-pattern. The operator by his hand first causes it to take one side of the blade-pattern. Now it will be seen that the blade-pattern will force the guide-lever or shifting-lever as far out of perpendicular as is necessary for it to pass along the blade-pattern, while the springs on the head-stock will keep the antifriction-roller close up to the edge of the pattern. As the shifting-lever governs the position of the spur in the head-stock, it is evident that as the shifting-lever varies in position so will the timber in the stocks be held in relation to the cutter. As it is desired to leave the timber in the oar thick in the center of the blade where it joins the handle and thin at the edges of the blade, it is evident that as the guiding and shifting lever is forced over by the blade-pattern the outer edge of the timber will be forced down upon the cutter and be cut away more than at the center; but it is also desired to have the blade thin crosswise as it proceeds from the handle, and as the blade-pattern gradually tapers away the shifting-lever will also right itself to the perpendicular by means of the springs, and consequently the blade of the oar will be made the same thickness all the way across. This operation only does one-half of one side of the blade. Therefore the operator gigs back the carriage, which in its forward motion causes the shifting-lever to take the opposite side of the blade-pattern. The locking-bolt 24 is then lifted out of its notch and the oar turned over and the same process gone through with on the other side. Then the oar is completed.

It will be observed that if the lugs of the head-stock, which slide in the grooves in the sides of the machine, were permitted to ride upon the switches 6 the blade of the oar would be as thick as it is wide. Therefore the operator when shaping the blade of the oar throws the handle 36, which moves the switch-shoes into the position indicated in Fig. 7. This causes the forward edges of the shoes to pass under the forward ends of the switches 6, which are shown as curved upward, and lift them over the lugs of the head-stock, whereby the said lugs pass from the lower channels or channels below the switch-tongues 6 to thus bring the timber down close to the cutter. In shaping the edges of the blade the shoes 34 are turned to such position as to ride upon the upper sides of the switches 6 and enter the upper channels 7, as will also the lugs of the head-stock. This will carry the timber upward gradually with relation to the cutter, thus forming the curved and straight portions of the oar-blade.

Having thus described my invention, I claim as new and desire to secure by Letters Patent—

1. In a machine for cutting work in irregular shapes, a frame comprising side pieces, a head-stock having lugs movable in guide-channels formed in said side pieces, a tail-stock having lugs movable in channels in said side pieces, the last-named channels being slightly higher than the first-named channels, switch-tongues arranged between the adjacent ends of the two channels, a switch-tongue-shifting device carried by the head-stock, and a cutter operating between the head and tail stocks, substantially as specified.

2. In a machine for cutting work in irregular shapes, a frame comprising side pieces provided with longitudinal channels on their inner sides, the said channels having portions arranged on different horizontal planes, a head-stock movable in one portion of the channels, a tail-stock movable from one portion to the other portion of said channels, and means carried by the head-stock for controlling a shifting device from one portion of the channels to the other.

3. In a machine for cutting work in irregular shapes, a frame comprising side pieces, a head-stock having lugs movable in guide-channels formed in said side pieces, a tail-stock having lugs movable in channels in said side pieces, the last-named channels being slightly higher than the first-named channels, switch-tongues arranged between the adjacent ends of the two channels, a switch-tongue-shifting device carried by the head-stock, and a cutter-head having its axis extended transversely to the movement of the work, substantially as specified.

4. In an oar-making machine, a frame having side portions provided with channels, the said channels having elevated sections, switch-tongues forward of said elevated sections, a carriage guided in said channels, a head-stock mounted on the carriage, a tail-stock mounted on the carriage, shifting shoes, a rock-shaft carried by the head-stock and carrying said shoes, an operating-lever for said rock-shaft, and a cutter-head for operating on the work, substantially as specified.

5. In a machine for cutting work in irregular shapes, a cutter-head, a carriage movable transversely of the axis of the cutter-head, a tail-stock on said carriage, a head-stock on said carriage, comprising a spindle carrying a spur and mounted to rotate and to have a longitudinal movement on the head-stock, a notched disk attached to the said spindle, a shifting-lever mounted to swing on the spindle, a locking-bolt on said lever and adapted for engaging in either one of the notches of the disk, and means for engaging the said shifting-lever to deflect it laterally, substantially as specified.

6. In a machine for cutting work in irregular shapes, a cutter-head, a carriage, a head-stock connected to said carriage and consisting of a spindle mounted to rotate relatively to the head-stock and to move longitudinally, a spur connected with said spindle, a shifting-lever having swinging connection with the spindle, means for locking said lever to the spindle, a tappet-arm adjustable longitudinally with relation to the lever, and a pattern with which said tappet-arm is designed to engage for shaping a part of the work, substantially as specified.

7. In a machine for cutting work in irregular shapes, the combination with a cutter and a carriage movable relatively to the cutter, of a head-stock comprising a base, a sleeve on said base, a spindle movable in the sleeve, a disk attached to the spindle and having peripheral notches, a lever extended upward relatively to the spindle, a locking-bolt mounted on said lever and adapted to engage in any one of the notches of the disk, a tappet-arm movable longitudinally in an opening formed in the lever, a finger-piece extended from said arm outward through a slot in a wall of the lever, a latch for engaging with said finger-piece, and a pattern adapted to be engaged by said tappet-arm, substantially as specified.

8. In a machine for cutting work in irregular shapes, the combination with a cutter and a carriage movable relatively to the cutter, of a head-stock, comprising a base-plate, a sleeve on said base-plate, a spindle movable in the sleeve, a disk attached to the spindle and having peripheral notches equally spaced apart, a collar mounted to rotate on the spindle, a lever extended upward from said collar, a locking-bolt mounted on said lever and adapted to engage in either one of the notches of the disk, a tappet-arm movable longitudinally in an opening formed in the lever, a finger-piece extended from said arm outward through a slot in a wall of the lever, a latch for engaging with said finger-piece, and a pattern adapted to be engaged by said tappet-arm, substantially as specified.

9. In a machine for cutting work in irregular shapes, the combination with a cutter and a carriage movable relatively to the cutter, of a head-stock, comprising a base-plate, a sleeve on said base-plate, a spindle movable in the sleeve, a disk attached to the spindle and having peripheral notches equally spaced apart, a collar mounted to rotate on the spindle, a lever extended upward from said collar, a locking-bolt mounted on said lever and adapted to engage in either one of the notches of the disk, a tappet-arm movable longitudinally in an opening formed in the lever, a finger-piece extended from said arm outward through a slot in a wall of the lever, a latch for engaging with said finger-piece, a pattern adapted to be engaged by said tappet-arm, and springs for moving said latch to its normal position, substantially as specified.

10. In a machine for making oars, a carriage for the work, a cutter-head shaft adjustable transversely of the movement of the carriage, two cutter-heads arranged side by side on the shaft, and means for holding said shaft as adjusted, substantially as specified.

In testimony whereof I have signed my name to this specification in the presence of two subscribing witnesses.

WILLIAM T. JONES.

Witnesses:
JOSEPH R. GRANT,
G. W. M. ROSBOULD.